J. RENWICK.
AUTOMOBILE WHEEL.
APPLICATION FILED JULY 13, 1917.

1,267,268.

Patented May 21, 1918.
2 SHEETS—SHEET 1.

WITNESSES

INVENTOR
J. Renwick,
BY Victor J. Evans
ATTORNEY

J. RENWICK.
AUTOMOBILE WHEEL.
APPLICATION FILED JULY 13, 1917.
1,267,268.
Patented May 21, 1918.
2 SHEETS—SHEET 2.
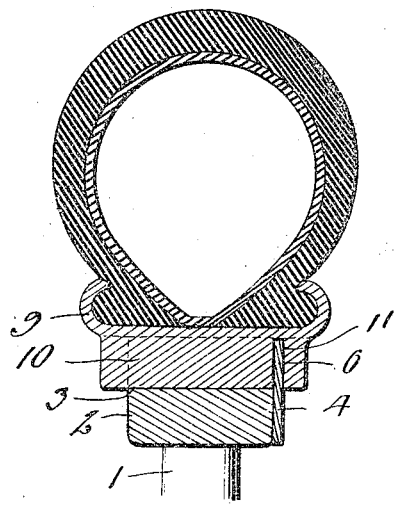
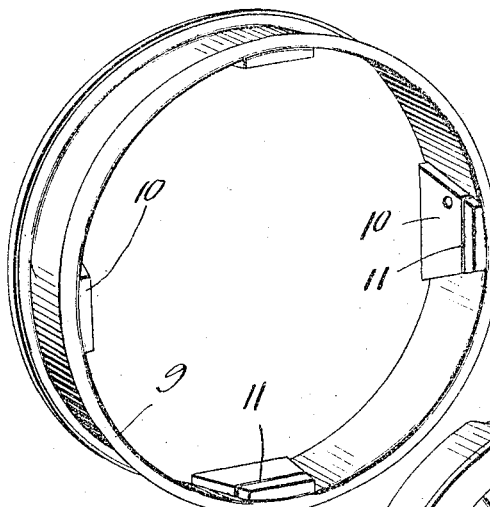
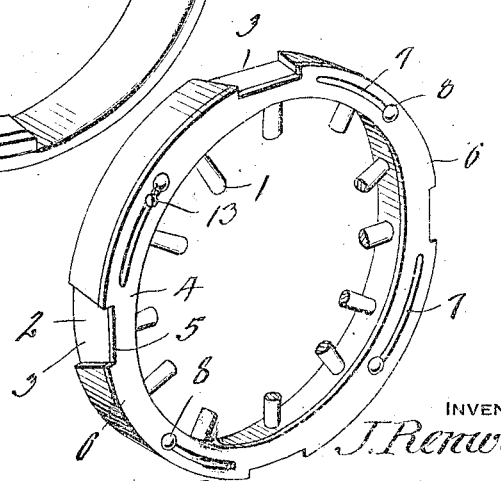
WITNESSES
INVENTOR
J. Renwick,
BY Victor J. Evans
ATTORNEY

UNITED STATES PATENT OFFICE.

JOHN RENWICK, OF EMMETT, IDAHO.

AUTOMOBILE-WHEEL.

1,267,268.

Specification of Letters Patent. Patented May 21, 1918.

Application filed July 13, 1917. Serial No. 180,434.

*To all whom it may concern:*

Be it known that I, JOHN RENWICK, a citizen of the United States, residing at Emmett, in the county of Gem and State of Idaho, have invented new and useful Improvements in Automobile-Wheels, of which the following is a specification.

This invention relates to improvements in wheels for automobiles and other vehicles and especially with reference to the provision of a wheel of this type embodying a demountable rim, the object of the invention being to effect improvements in the construction of the wheel and of the demountable rim whereby the demountable rim may be readily mounted and locked in such position and may be also readily demounted when desired and without the employment of tools of any kind.

With the above and other objects in view the invention consists in the construction, combination and arrangement of devices hereinafter described and claimed.

In the accompanying drawings:—

Fig. 3 is a sectional view of the same on the plane indicated by the line 3—3 of Fig. 1.

Fig. 4 is a detailed perspective view of the demountable rim.

Fig. 5 is a similar view of the wheel and the locking ring.

Figure 1:
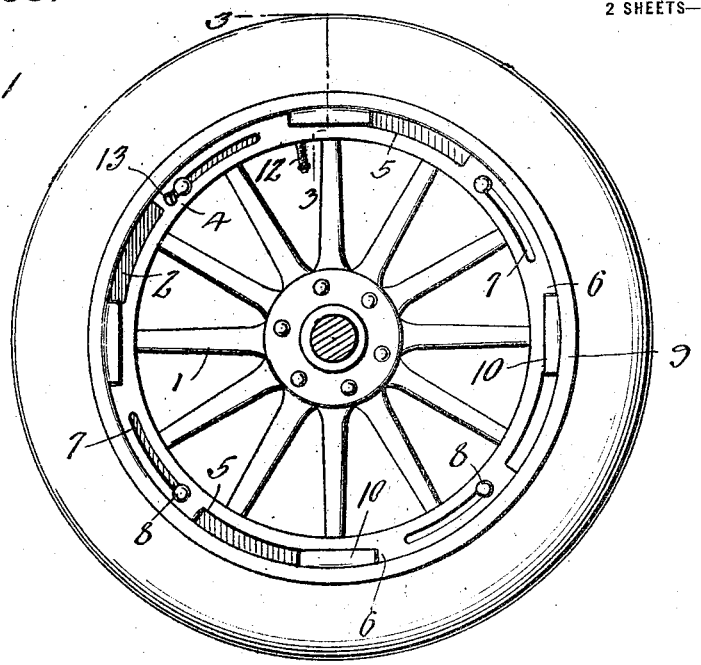
Figure 1 is an elevation of a wheel provided with a demountable rim and a locking ring for the demountable rim constructed and arranged in accordance with my invention.
Figure 2:
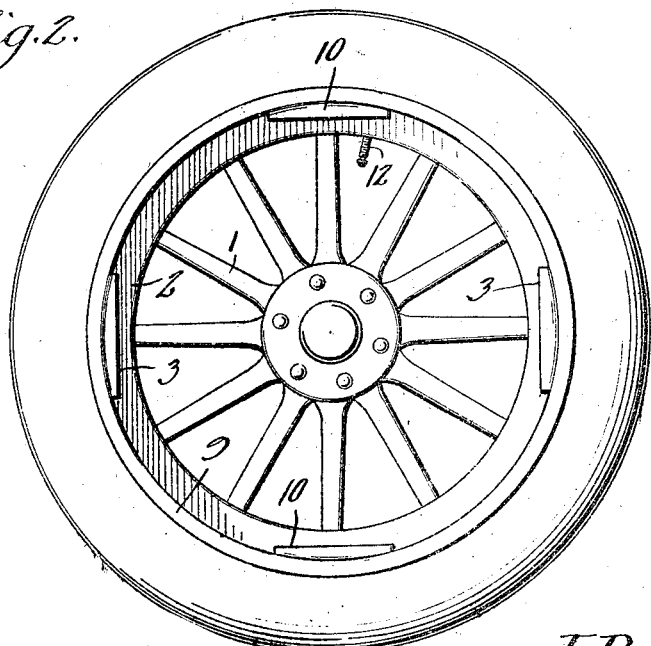
Fig. 2 is a similar view showing the opposite side of the wheel.

The wheel 1 is provided with the usual felly or rim 2 which in accordance with my invention is provided at suitable points with peripheral notches 3 which extend across the same transversely and the sides of which converge toward the inner side of the wheel. These notches are preferably arranged equally distant apart. On the inner side of the felly of the wheel is a locking ring 4 which is provided with notches 5 which correspond with the notches 3, segmental locking portions 6 being formed between said notches 5. The locking ring is also provided with segmental slots 7 which are concentric therewith and with the wheel. Bolts 8 secure the locking ring slidably to the inner side of the wheel rim and extend through the slots 7 and hence permit the locking ring to be partially turned in either direction to arrange its notches 5 either in or out of registry with the notches 3.

The demountable rim 9, which may otherwise be of any suitable construction and may be provided with any suitable form of tire, is provided on its inner periphery or side with transversely arranged segments 10 the sides of which converge in one direction, so that said segments are substantially wedge-shape, and the said segments are adapted to enter the notches of the felly and locking ring when the locking ring is arranged with its notches in registry with the notches of the felly. Owing to the wedge-shape of the segments further movement of the demountable rim is arrested when the demountable rim is arranged on the wheel rim in the required relation thereto. The said segments 10 are each provided with a groove 11 to receive one of the flanges 6 of the locking ring when the latter is turned to locking position with its notches out of registry with the notches of the felly and the wedge-shaped locking segments of the demountable rim.

The usual valve for inflating the tire is indicated at 12. When demounting the demountable rim the locking ring is first turned to releasing position to arrange its notches in registry with the notches of the felly and disengage its segment flanges from the grooves of the locking segments of the demountable rim and said demountable rim is then grasped at a point opposite the valve and drawn outwardly from the corresponding portion of the wheel and may then be readily disengaged from the valve, without disturbing the latter, the opening in the felly and through which the valve extends being sufficiently large to clear the valve when the demountable rim is thus manipulated.

To secure the locking ring in locking position a thumb screw 13 is provided which is engaged in a threaded opening in the wheel rim and arranged in one end of one of the slots of the locking ring.

While I have herein shown and described a preferred form of my invention I would have it understood that changes may be made in the form, proportion and construction of the several parts, without departing from the spirit of my invention and within the scope of the appended claim.

Having thus described my invention, what I claim is:—

In combination with a wheel having a felly provided with peripheral notches and a locking ring mounted for oscillatory movement on one side of the felly and having notches adapted to be arranged in or out of registry with those of the felly, a demountable rim having locking segments on its inner side for arrangement in the notches of the felly, said segments having grooves for engagement by the locking ring, the said segments being wedge-shape and the sides of said notches being correspondingly angularly related to enable said locking segments to fit therein.

In testimony whereof I affix my signature.

JOHN RENWICK.